(12) United States Patent
Foley et al.

(10) Patent No.: US 8,312,324 B2
(45) Date of Patent: Nov. 13, 2012

(54) REMOTE DIAGNOSTIC SYSTEM AND METHOD BASED ON DEVICE DATA CLASSIFICATION

(75) Inventors: Diane Marie Foley, Palmyra, NY (US); Shi Zhao, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 221 days.

(21) Appl. No.: 12/695,790

(22) Filed: Jan. 28, 2010

(65) Prior Publication Data
US 2011/0185220 A1 Jul. 28, 2011

(51) Int. Cl.
*G06F 11/00* (2006.01)
(52) U.S. Cl. .............. 714/31; 714/26; 714/37; 706/20; 706/45
(58) Field of Classification Search .............. 714/31, 714/37, 26; 706/20, 45
See application file for complete search history.

(56) References Cited

U.S. PATENT DOCUMENTS

| | | | |
|---|---|---|---|
| 5,920,405 A | 7/1999 | McIntyre et al. | 358/442 |
| 5,923,834 A | 7/1999 | Thieret et al. | 395/183.01 |
| 6,154,736 A * | 11/2000 | Chickering et al. | 706/59 |
| 6,246,485 B1 * | 6/2001 | Brown et al. | 358/1.13 |
| 6,510,431 B1 * | 1/2003 | Eichstaedt et al. | 1/1 |
| 6,519,552 B1 | 2/2003 | Sampath et al. | 702/183 |
| 6,718,315 B1 * | 4/2004 | Meek et al. | 706/12 |
| 6,782,495 B2 * | 8/2004 | Bernklau-Halvor | 714/44 |
| 6,879,973 B2 * | 4/2005 | Skaanning et al. | 706/52 |
| 6,892,317 B1 | 5/2005 | Sampath et al. | 714/4 |
| 7,158,958 B2 * | 1/2007 | Przytula et al. | 706/45 |
| 7,356,430 B2 * | 4/2008 | Miguelanez et al. | 702/108 |
| 7,406,271 B2 | 7/2008 | Robinson | 399/9 |
| 7,474,428 B2 | 1/2009 | Morris-Jones et al. | 358/1.15 |
| 7,525,676 B2 | 4/2009 | Pesar | 358/1.13 |
| 7,536,595 B1 * | 5/2009 | Hiltunen et al. | 714/26 |
| 7,567,946 B2 | 7/2009 | Andreoli et al. | 706/46 |
| 7,730,363 B2 * | 6/2010 | Takezawa et al. | 714/47.1 |
| 7,983,490 B1 * | 7/2011 | Minter | 382/224 |
| 8,037,001 B2 * | 10/2011 | Starr | 706/45 |
| 8,069,370 B1 * | 11/2011 | Li et al. | 714/26 |
| 8,214,317 B2 * | 7/2012 | Aguilar et al. | 706/52 |
| 2003/0110412 A1 * | 6/2003 | Neville | 714/25 |
| 2003/0110413 A1 * | 6/2003 | Bernklau-Halvor | 714/25 |
| 2005/0043922 A1 * | 2/2005 | Weidl et al. | 702/183 |
| 2005/0144532 A1 * | 6/2005 | Dombrowa et al. | 714/39 |
| 2006/0206445 A1 | 9/2006 | Andreoli et al. | 706/52 |

(Continued)

OTHER PUBLICATIONS

P. Domingos, M. Pazzani; On the Optimality of the Simple Bayesian Classifier under Zero-One Loss; Kluwer Academic Publishers, Boston. pp. 1-30.

*Primary Examiner* — Loan L. T. Truong
(74) *Attorney, Agent, or Firm* — Kevin Soules; Kermit D. Lopez; Luis M. Ortiz

(57) ABSTRACT

A remote diagnostic system and method based on device data classification. Device diagnostic data with respect to a device can be acquired and a conditional probability look up table can be constructed for each fault code associated with the device diagnostic data by a classification module. A score function can then be created by summing the conditional probabilities and an occurrence of the fault code can be mapped to a service call category with a numerically highest score function. The fault occurrence data in association with a number of time stamps and device identifiers can be stored in a data warehouse. The occurrence of fault code can be matched with respect to a solution set which can be automatically dispatched to a customer via a communications link.

18 Claims, 4 Drawing Sheets

U.S. PATENT DOCUMENTS

| | | | |
|---|---|---|---|
| 2006/0248178 A1 | 11/2006 | Thieret | 709/223 |
| 2007/0074076 A1* | 3/2007 | Imai et al. | 714/26 |
| 2007/0220365 A1* | 9/2007 | Castellani et al. | 714/46 |
| 2007/0268509 A1 | 11/2007 | Andreoli et al. | 358/1.14 |
| 2007/0294090 A1 | 12/2007 | Thieret et al. | 705/1 |
| 2008/0002995 A1* | 1/2008 | Kamisuwa et al. | 399/8 |
| 2008/0059840 A1* | 3/2008 | Takezawa et al. | 714/37 |
| 2008/0300879 A1 | 12/2008 | Bouchard et al. | 704/256 |
| 2009/0070279 A1* | 3/2009 | Rajabally | 706/12 |
| 2009/0094091 A1 | 4/2009 | Thieret et al. | 705/9 |
| 2009/0199045 A1* | 8/2009 | Kasubuchi et al. | 714/38 |
| 2009/0216698 A1 | 8/2009 | Bouchard et al. | 706/46 |
| 2009/0216700 A1 | 8/2009 | Bouchard et al. | 706/46 |
| 2009/0271433 A1 | 10/2009 | Perronnin et al. | 707/103 R |
| 2009/0307612 A1* | 12/2009 | Singh et al. | 715/758 |
| 2010/0011255 A1* | 1/2010 | de Kleer et al. | 714/47 |
| 2010/0014756 A1* | 1/2010 | Kato et al. | 382/173 |
| 2010/0057649 A1* | 3/2010 | Lee et al. | 706/12 |
| 2010/0058112 A1* | 3/2010 | Kim et al. | 714/37 |
| 2010/0153332 A1* | 6/2010 | Rollins et al. | 707/603 |
| 2010/0228423 A1* | 9/2010 | Howell et al. | 701/29 |
| 2010/0318855 A1* | 12/2010 | Beg et al. | 714/39 |
| 2011/0153540 A1* | 6/2011 | Beg et al. | 706/52 |

* cited by examiner

REMOTE DIAGNOSTIC SYSTEM AND METHOD BASED ON DEVICE DATA CLASSIFICATION

TECHNICAL FIELD

Embodiments are generally related to multi-function devices such as, printers, scanners, photocopy machines, and the like. Embodiments are also related to diagnostic systems and techniques. Embodiments are additionally related to the classification of device data.

BACKGROUND OF THE INVENTION

Diagnostic techniques are generally employed to repair problems in complex devices such as, for example, an MFD (Multi-Function Device). Such diagnostic techniques can also be employed to identify and distinguish the cause of failure in a machine component from a failure symptom, as well as to predict the occurrence of a particular failure type from precursors.

An MFD is a rendering device or office machine, which incorporates the functionality of multiple devices in one apparatus or system, so as to have a smaller footprint in a home or small business setting, or to provide centralized document management/distribution/production in the context of, for example, a large-office setting. A typical MFP can provide a combination of some or all of the following capabilities: printer, scanner, photocopier, fax machine, e-mail capability, and so forth.

Problems that can be encountered with a fleet of MFDs before an MFD product is launched are often easily observable, repeatable, and diagnosable by an engineering team. Such problems can be repaired utilizing built-in diagnosis tools such as, for example, fault codes, electronic documents, and knowledge base documentation provided in association with the MFDs. Problems with indirect causes are more difficult to diagnose and repair.

Problems that occur with MFD products can sometimes be repaired based on a conversation with the customer as the first level of support. Conversations between customers and a servicing enterprise are often time consuming and costly for both the customer and the enterprise. Additionally, "helpdesk" calls can be annoying for customers because much time is spent gathering preliminary information regarding the product before the essence of the problem is addressed.

Conventional diagnosis systems for identifying difficult problems involve the provision of device data (e.g., fault codes, status codes, usage counters and sensor readings) to a remote server in the form of an error report to figure out the problems remotely. The server couples the device data and the customer call, analyzes the transmitted data and provides a single response back to the user. Such prior art techniques for the classification of the device data with respect to a service action have succeeded with only a small fraction of the calls as the device data is noisy and uncertain.

Based on the foregoing, it is believed that a need exists for an improved remote diagnostic system and method. A need also exists for an improved classification technique for classifying a set of device data in accordance with a problem type, as described in greater detailed herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved method and system for configuring a multi-function device (MFD), such as a printer, scanner, photocopy machine, fax machine, etc., or a combination thereof.

It is another aspect of the disclosed embodiments to provide for an improved remote diagnostic system and method.

It is a further aspect of the disclosed embodiments to provide for an improved classification method and system for classifying a set of device data in accordance with a problem type.

The aforementioned aspects and other objectives and advantages can now be achieved as described herein. A remote diagnostic system and method based on the use of a device data classification algorithm is disclosed. Device diagnostic data with respect to a device can be acquired. A conditional probability look up table can be constructed with respect to each fault code associated with the diagnostic data by employing and processing instructions associated with a classification module. A score function can then be created by summing the conditional probabilities. An occurrence of the fault code can be then mapped to a service call category with a numerically highest score function.

The conditional probability can change with respect to the number of fault occurrences in a time window before the service call. The fault occurrence data in association with the number of time stamps and device identifiers can be stored in a data warehouse or database or other appropriate computer memory. The occurrence of fault code can be matched with a solution set by a support server. The solutions with respect to such problems can be automatically dispatched to a customer via a communications link (e.g., Internet).

The device diagnostic data can include for example, fault codes, status codes, usage counters, sensor readings and so forth. The device can be coupled to a computer having a Web browser for connecting to the Internet or another appropriate computer network. A rules engine associated with the support server analyzes the diagnostic data in order to determine a cause of the problem or problems. The suggested solution set can be determined from information contained in a database of solutions based on the diagnostic data and the fault code. The suggested solution can be shared with a customer, for example, via a welcome center agent and/or a service technician (via a PDA (Personal Digital Assistant)) depending on the severity of the problem.

The support server implementing the rules engine enables the support center to possess the latest diagnostics utilities as well as the latest solutions to the problems. The communications link enables a large number of users to communicate quickly and efficiently with the support server.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
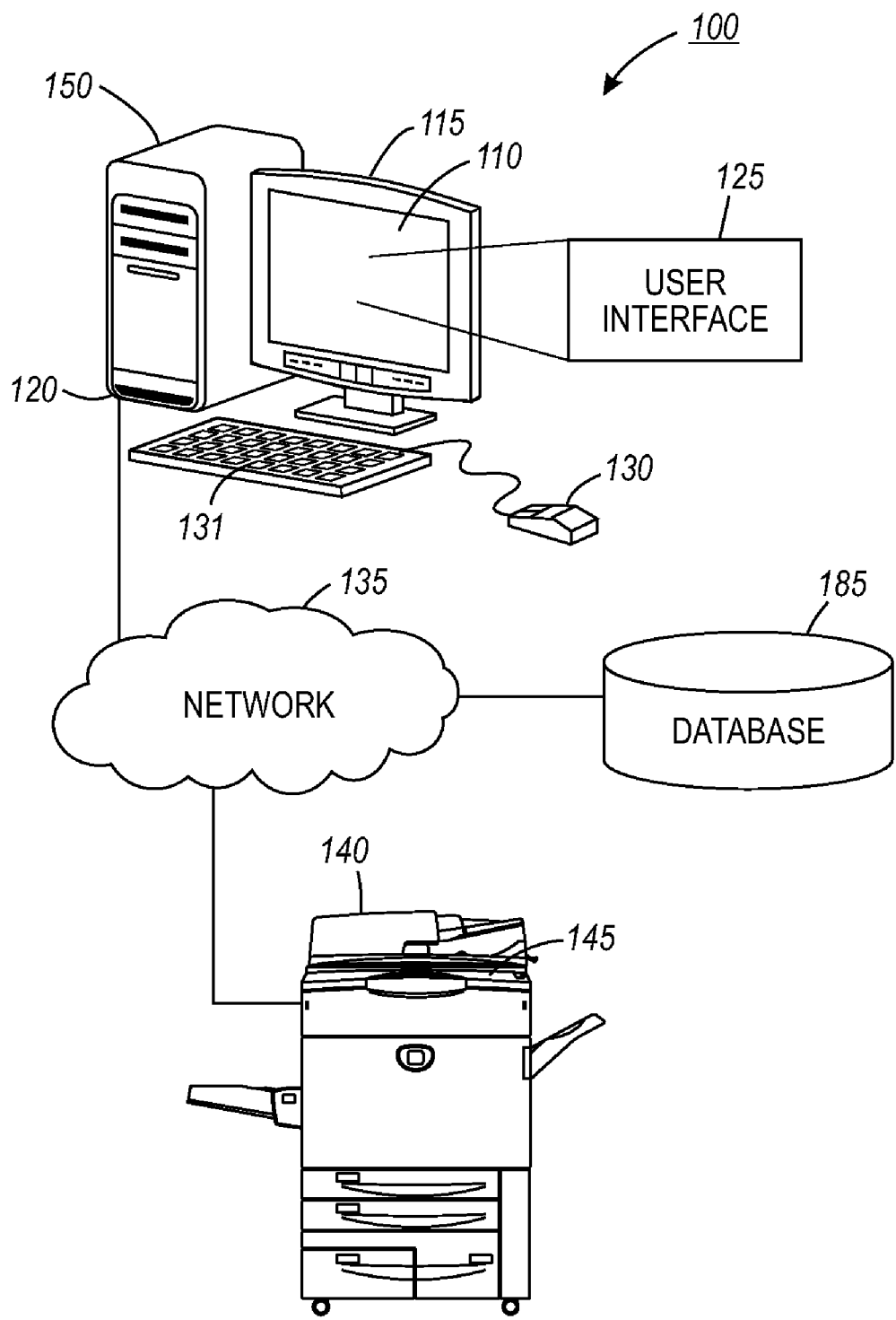
FIG. 1 illustrates an example of an MFD coupled to a data-processing apparatus through a network, in accordance with the disclosed embodiments.

FIG. 1 is provided as an exemplary diagram of data processing environments in which embodiments of the present invention can be implemented. It should be appreciated that FIG. 1 is only exemplary and is not intended to assert or imply any limitation with regard to the environments in which aspects or embodiments of the present invention can be implemented. Many modifications to the depicted environments can be made without departing from the spirit and scope of the present invention.

Referring to FIG. 1, system 100 includes a multi-function device 140 coupled to a data-processing apparatus 110 through a network 135. The data-processing apparatus 110 can be, for example, a personal computer or other computing device, and generally includes a central processor 120, a display device 115, a keyboard 131, and a pointing device 130 (e.g., mouse, track ball, pen device, or the like). Additional input/output devices, such as the multi-function device 140 can be included in association with the data-processing apparatus 110 as desired.

Note that as utilized herein, the term multi-function device (including the acronym MFD) can refer to an apparatus or system such as a printer, scanner, fax machine, copy machine, etc., and/or a combination thereof. Preferably, MFD 140 is capable of multiple rendering functions such as printing, copying, scanning, faxing, etc. In some embodiments, MFD 140 can be implemented with a single rendering function such as printing. In other embodiments, MFD 140 can be configured to provide multiple rendering functions, such as scanning, faxing, printing and copying.

A non-limiting example of an MFD that can be utilized as MFD 140 is disclosed in U.S. Pat. No. 7,525,676, entitled "System and Method for Controlling Access to Programming Options of a Multifunction Device," which issued on Apr. 28, 2009 to Robert J. Pesar. U.S. Pat. No. 7,525,676, which is incorporated herein by reference in its entirety, is assigned to the Xerox Corporation of Norwalk, Conn. Another non-limiting example of an MFD that can be utilized as MFD 140 is disclosed in U.S. Pat. No. 7,474,428, entitled "Multifunction Device System Using Tags Containing Output Information," which issued on Jan. 6, 2009 to Morris-Jones, et al. U.S. Pat. No. 7,474,428, which is incorporated herein by reference in its entirety, is also assigned to the Xerox Corporation of Norwalk, Conn. An additional example of an MFD that can be utilized as MFD 140 is disclosed in U.S. Pat. No. 5,920,405, entitled "Multifunction Device With Printer Facsimile Contention Selection," which issued on Jul. 6, 1999 to McIntyre, at al. U.S. Pat. No. 5,920,405, which is incorporated herein by reference in its entirety, is also assigned to the Xerox Corporation of Norwalk, Conn.

Network 135 can employ any network topology, transmission medium, or network protocol. Network 135 can include connections, such as wire, wireless communications links, or fiber optic cables. The MFD 140 includes a user interface 145, such as a panel menu. The panel menu can be employed to select features and enter other data in the MFD 140. Such interfaces can include, for example, touch screens having touch activated keys for navigating through an option menu or the like.

A MFD driver program can be installed on the data-processing apparatus 110 and can reside on the host device's hard drive 150. The MFD driver program can be activated through an application interface so that a user can generate a print job with the MFD driver for processing by the MFD 140. The data-processing apparatus 110 also includes a GUI 125 for communicating MFD features for processing, for example, a print job to a user and accepting the user's selection of available MFD features. The user interface 125 displays information and receives data through device display and/or the keyboard/mouse combination. The interface 125, also serves to display results, whereupon the user can supply additional inputs or terminate a given session. The data-processing apparatus 110 can be, for example, any computing device capable of being integrated within a network, such as a PDA, personal computer, cellular telephone, point-of-sale terminal, server, etc.

Note that the user interface as utilized herein generally refers to a type of environment that represents programs, files, options and so forth by means of graphically displayed icons, menus, and dialog boxes on a screen. The input device of the multi-function device 140 includes can be a local user interface, such as a touch-screen display or separate keypad and display or a memory fob or the like as discussed above. Alternatively or additionally, the input device can be a wireless port that receives a wireless signal containing constraint data from a portable device. The wireless signal can be an infrared or electromagnetic signal. A system administrator can input constraint data through the local user interface by manipulating the touch screen, keypad, or communicating via wireless messages through the wireless port. The administrator's portable device that communicates wirelessly can be a personal digital assistant (PDA), or the like, as noted above.

The following description is presented with respect to embodiments of the present invention, which can be embodied in the context of a data-processing apparatus 110 and MFD 140 depicted in FIG. 1. The present invention, however, is not limited to any particular application or any particular environment. Instead, those skilled in the art will find that the system and methods of the present invention can be advantageously applied to a variety of system and application software, including database management systems, word processors, and the like. Moreover, the present invention can be embodied on a variety of different platforms, including Macintosh, UNIX, LINUX, and the like. Therefore, the description of the exemplary embodiments, which follows, is for purposes of illustration and not considered a limitation.

Figure 2:
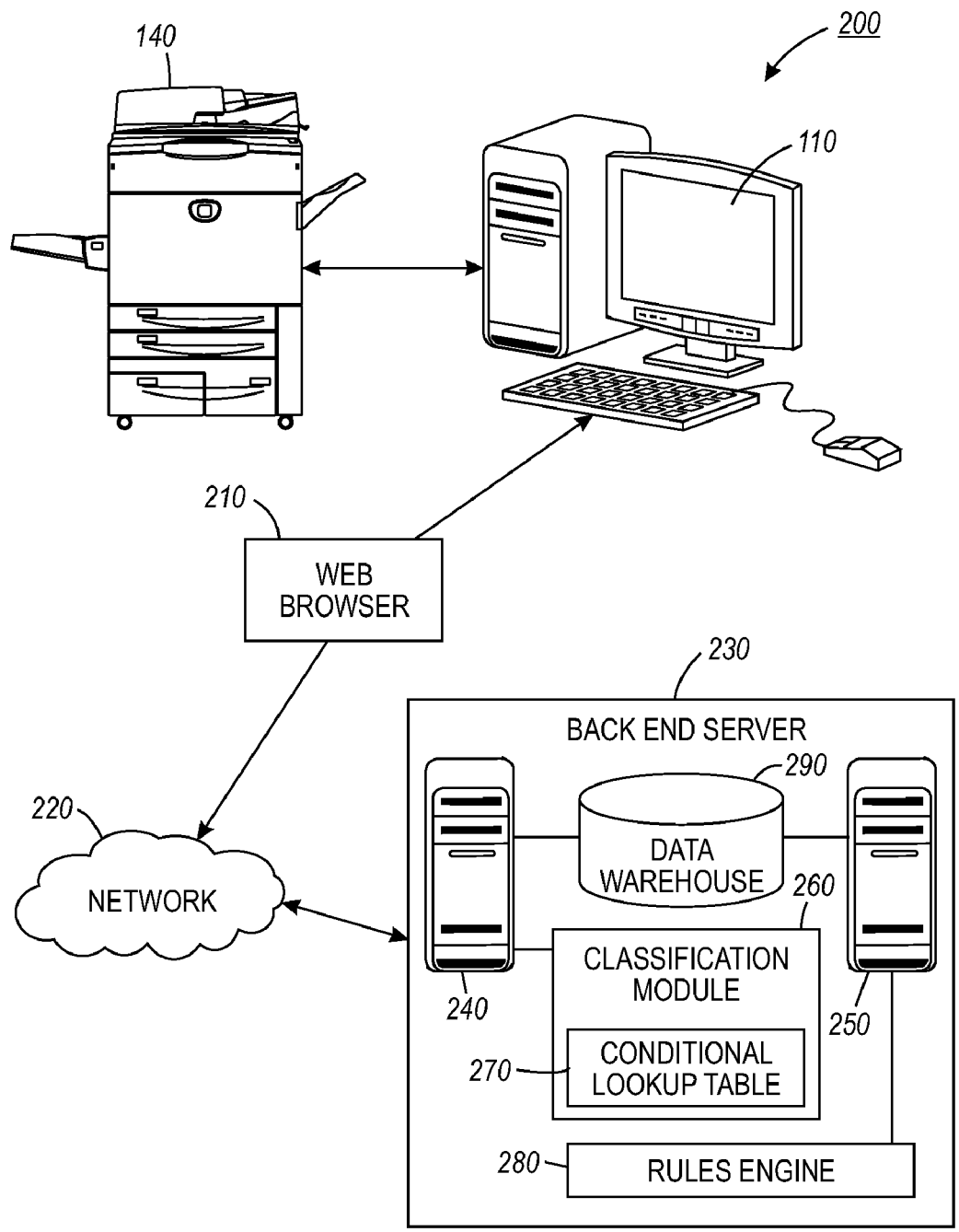
FIG. 2 illustrates a graphical representation of a remote diagnostic system, in accordance with the disclosed embodiments.

FIG. 2 illustrates a graphical representation of a remote diagnostic system 200, in accordance with the disclosed embodiments. Note that in FIGS. 1-4, identical or similar parts are generally indicated by identical reference numerals. The diagnostic system 200 generally includes a back end server 230 and one or more devices such as, for example, the MFD 140 located remote from the back end server 230. Communication between the back end server 230 and the MFD 140 can be made via the Internet with network 220 or other communications channel as can be available. The Internet with network 220 represents a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages.

Note that the embodiments discussed herein generally relate to a multi-function device. It can be appreciated, however, that such embodiments can be implemented in the context of other systems and devices. The discussion of multi-function device, as utilized herein, is presented for general illustrative purposes only. The MFD can be, for example, an office machine, which incorporates the functionality of multiple devices in one, so as to provide centralized document management, document distribution and production in a large-office setting and the like. The typical MFD can act as a combination of a printer, scanner, photocopier, fax and e-mail. While a single multi-function device 140, are shown by way of example, it is to be appreciated that any number of rendering devices can be linked to the network, such as two, four, six or more rendering devices. In general, the multi-function device 140 can be employed to perform a rendering output function (e.g., printing, scanning, copying, faxing, etc) within a networked environment.

The printer driver associated with the MFD 140 can communicate through a web browser 210 located on the data-processing apparatus 110 to communicate the back end server 230 via the Internet 220. Alternatively, the printer driver can include the web browser 210 to communicate the back end server 230 via the Internet 220. The back end server 230 further includes a diagnostic server 240, a support server 250 and a data warehouse 290. The data warehouse 290 can be implemented as a computer memory component. Data warehouse 290 is analogous to the database 185 depicted in FIG. 1.

Note that the Web browser 210 can be implemented as a software application for retrieving, presenting, and traversing information resources on the World Wide Web. An information resource can be identified by a Uniform Resource Identifier (URI) and may be a web page, image, video, or other piece of content. Hyperlinks present in resources enable users to easily navigate their browsers to related resources. Although browsers such as Web browser 210 are primarily intended to access the World Wide Web, they can also be used to access information provided by Web servers in private networks or files in file systems. Examples of Web browsers include, but are not limited to, for example, Internet Explorer, Mozilla Firefox, Google Chrome, Apple Safari, and Opera for Windows and Apple Safari, Mozilla Firefox and Opera for Macintosh, and so forth.

The user can transmit a request for support to the back end server 230 when a user encounters problem with respect to the MFD 140. Diagnostic data 310 associated with the MFD 140 can be sent to the back end server 230. Diagnostic data 310 can include machine identity, location, fault codes, usage history, and other important data that can be useful to those skilled in the art for diagnosing the MFD 140. The diagnostic data 310 can be transmitted as an electronic document via the network 220 to the remote back end server 230 to provide support for the MFD 140 and to customers.

The diagnostic server 240 further includes a classification module 260 that can be adapted for classifying the device diagnostic data 310 according to a problem type and extracting one or more fault code. Note that as utilized herein, the term "module" may refer to a physical hardware component and/or to a software module. In the computer programming arts, such a software "module" can be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module can be configured as an implementation, which can be private (i.e., accessible only to the module), and which contains the source code that actually implements the routines or subroutines upon which the module is based. Such a module can thus include instructions, which are stored in a computer memory and then retrieved and executed by, for example, a data-processing system such as, for example the system 100 shown in FIG. 1, the system 200 depicted in FIG. 2, and so forth.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media, including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media, such as floppy disks, hard disk drives, CD ROMs, CD-Rs, etc., and transmission media, such as digital and/or analog communications links. Examples of transmission media can also include devices such as modems, which permit information to be transmitted over standard telephone lines and/or the more advanced digital communications lines.

The classification module can be adapted to construct a conditional probability look up table 270 for each fault code and to create a score function by summing the conditional probabilities for mapping the occurrence of fault code to a service call category. The conditional probability can change with the number of fault occurrence in a time window before the call. The fault occurrence data in association with a number of time stamps and device identifiers can be stored in a data warehouse 290. A rules engine 280 associated with the support server 250 provides mechanism to tie the information received from a user 340 to the appropriate self-support solution 320. The function of the rules engine 280 is to interface with the support server 250 to deliver the solution 320 to the user 340 via the browser 210. The rules that the rules engine 280 relies on can be stored in the data warehouse 290. These rules can be stored in the data warehouse 290 for easy addition, modification, and maintenance.

Figure 3:
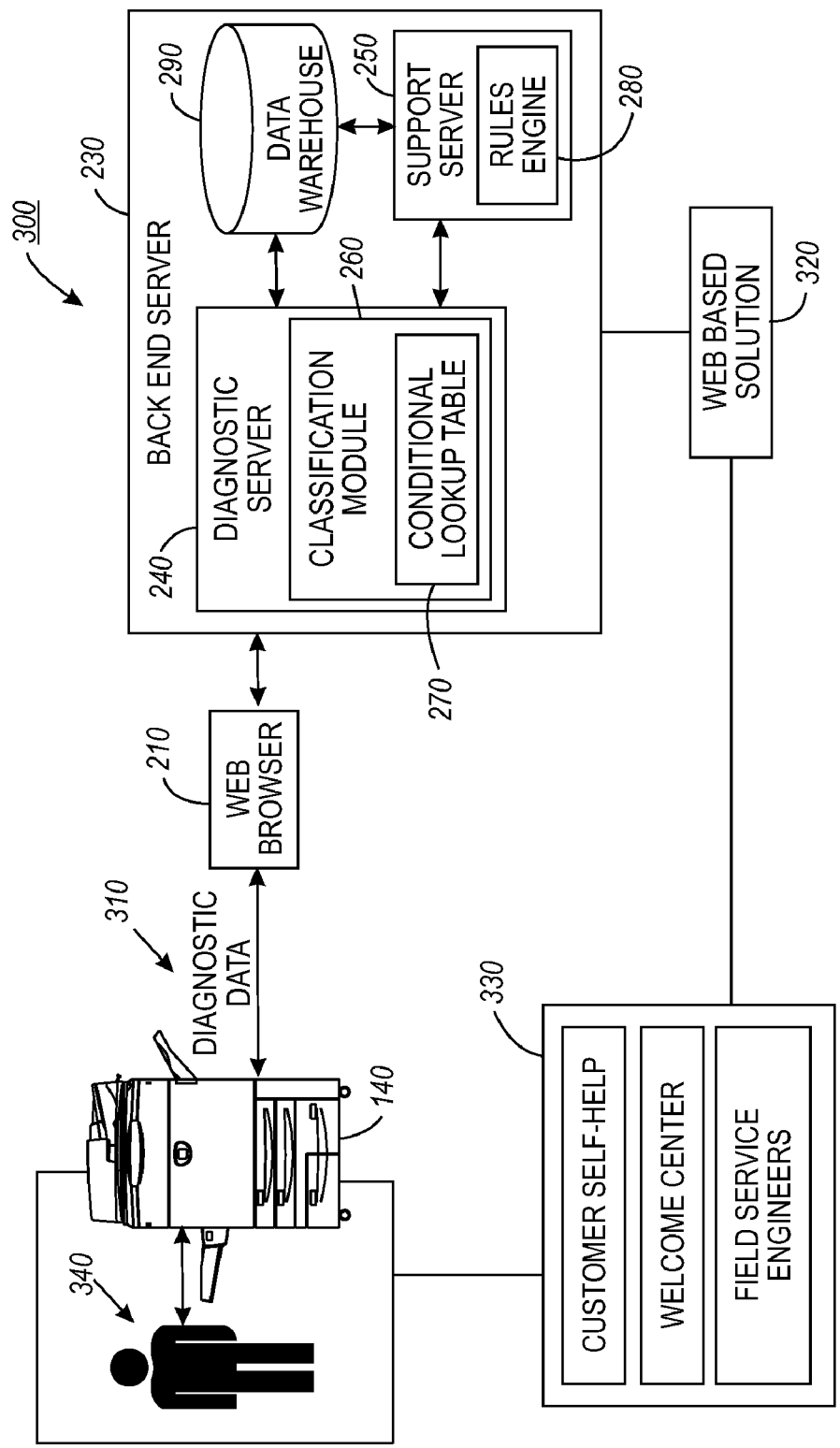
FIG. 3 illustrates a block diagram of the remote diagnostic system associated with a classification module for extracting fault codes with respect to a problem from a set of device data, in accordance with the disclosed embodiments.

FIG. 3 illustrates a block diagram of the remote diagnostic system 200 associated with the classification module 260 for extracting fault codes with respect to a problem from the device data 310, in accordance with the disclosed embodiments. The diagnostic data 310 associated with the MFD 140 transmitted from field activities can be classified according to problem type by the diagnostic server 240 based on the classification module 260. The device diagnostic data 310 can include for example, fault codes, status codes, usage counters, sensor readings and so forth. The classification module 260 includes statistical classification algorithms to associate the device data with service actions. The conditional look up table 270 can be constructed for each fault code and the probability of classifying a customer call to a call type category can be determined. For example, a call type k, with x occurrences of fault code j can be computed as the number of customer calls which possess at least x occurrences of fault code j. The customer calls can be classified as call type k by a CSE (Customer Service Engineer) divided by the total number of customer calls which possess at least x occurrences of fault code, j.

Table. 1 illustrates a conditional probability look-up table to calculate the conditional probability for a Nuvera fault code: PEM-10-1400 appearing at least two times in four hours prior to the call. For example, consider there are a total 146 calls of all types containing PEM-10-1400 at least two times. The call possess ~80% chance of being classified as a fuser subsystem problem by the CSE if the PEM 10-1400 is observed twice in four hours.

call type category can be created. The score function for the call type category k, is the summation of all the conditional probability of classifying to call type k, provided the occurrence of fault code j in the customer call. The score function for mapping a customer call T to subsystem k can be expressed by the following equation (2):

$$S(\text{subsystem } k) = \Sigma(j=1)'M \ \Xi ZP(\text{Subsystem } k-|\text{Fault Code } j=X(T \cdot j) \qquad (2)$$

In equation (2) above, the parameter X (T, j) represents the count of the fault code j with respect to the customer call T.

TABLE 1

|  | FINISHING | XEROGRAPHICS/ROS | SCANNER/DOC HANDLER | PAPER FEED/REG | PRINT XPORT/FUSING | ELECTRICAL/UI/NET CONTROLLER | INTEGRATED SYSTEM |
|---|---|---|---|---|---|---|---|
| CALL COUNT | 8 | 5 | 1 | 11 | 115 | 0 | 6 |
| PROBABILITY | 8/146 | 5/146 | 1/146 | 11/146 | 115/146 | 0/146 | 6/146 |

The conditional probability can be calculated as shown in equation (1), as follows:

$$P(\text{subsystem } k \mid \text{fault code } j = x) = \frac{\sum_{i=1}^{N} I\{X(i,j) \geq x, Y(i) = k\}}{\sum_{i=1}^{N} I\{X(i,j) \geq x\}} \qquad (1)$$

Where "I { }" represents an indicator function and the value is 1 if the statement in the curly brackets is true, otherwise 0. The score function for mapping the customer call to a Note that Table. 2 illustrates the score functions calculated for a customer call associated with 11 different fault codes (Nuvera EA field service calls data) and the "subsystem location" can be considered as the call type. However, other possible markers such as, for example, problem code (discrete), call without parts (discrete), broken call (discrete), call duration (continuous) can also be considered. The row under name count represents the count of each fault code and from the third row to the ninth row, the conditional probabilities are presented. The score functions for each subsystem are listed in the last column under name score from third row to the ninth row.

TABLE 2

|  | SFM.08.1551 | SFM.08.1552 | SFM.07.3202 | FTM.12.1570 | FTM.12.3220 | FTM.12.3200 |
|---|---|---|---|---|---|---|
| COUNT | 3 | 8 | 1 | 2 | 2 | 2 |
| ELECTRICAL/UI/NET CONTROLLER | 0.00 | 0.11 | 0.00 | 0.01 | 0.03 | 0.06 |
| FINISHING | 0.17 | 0.22 | 0.18 | 0.45 | 0.39 | 0.48 |
| INTEGRATED SYSTEM | 0.00 | 0.00 | 0.00 | 0.03 | 0.03 | 0.03 |
| PAPER FEED/REG | 0.34 | 0.33 | 0.15 | 0.12 | 0.15 | 0.13 |
| PRINT XPORT/FUSING | 0.20 | 0.33 | 0.33 | 0.20 | 0.22 | 0.19 |
| SCANNER/DOC | 0.03 | 0.00 | 0.02 | 0.00 | 0.01 | 0.02 |
| XEROGRAPHICS/ROS | 0.26 | 0.00 | 0.33 | 0.20 | 0.01 | 0.09 |

|  | SFM.07.3312 | SFM.08.1101 | PEM.10.3300 | SFM.08.1510 | FTM.01.3300 | SCORE |
|---|---|---|---|---|---|---|
| COUNT | 2 | 1 | 1 | 1 | 2 | 25 |
| ELECTRICAL/UI/NET CONTROLLER | 0.00 | 0.03 | 0.03 | 0.03 | 0.03 | 0.33 |
| FINISHING | 0.10 | 0.22 | 0.24 | 0.24 | 0.53 | 3.23 |
| INTEGRATED SYSTEM | 0.05 | 0.04 | 0.05 | 0.04 | 0.07 | 0.34 |
| PAPER FEED/REG | 0.30 | 0.18 | 0.17 | 0.28 | 0.12 | 2.26 |
| PRINT XPORT/FUSING | 0.35 | 0.27 | 0.41 | 0.27 | 0.12 | 2.89 |
| SCANNER/DOC | 0.00 | 0.02 | 0.01 | 0.01 | 0.02 | 0.13 |
| XEROGRAPHICS/ROS | 0.20 | 0.25 | 0.09 | 0.13 | 0.00 | 1.81 |

The service call can be mapped to the subsystem with the numerically highest score which can be obtained by the equation (3), as follows:

$$\operatorname*{Arg\,max}_{1 \leq k \leq K} S(\text{Subsystem } k) \qquad (3)$$

The classification algorithm correctly maps the call to the finishing subsystem in Table. 2. The fault codes are specific to finishers, and other codes can be neglected or de-prioritized when making recommendations on how to solve the customer's problem. Further, a confusion matrix for an exemplary training set is illustrated in Table. 3. The rows can be observed by a CSE and columns can be predicted by the classification module 260 using the fault code data. The calls on the diagonal of the matrix can be properly classified.

ditional probabilities, as indicated at block 430. The occurrence of the fault code can be mapped to the service call category with numerically highest score function, as illustrated at block 440. The fault occurrence data in association with a number of time stamps and device identifiers can be stored in the data warehouse 290, as depicted at block 450. The occurrence of fault code can be matched with a solution set by the support server 250, as illustrated at block 460. The solutions with respect to such problems can be automatically dispatched to a customer via a communications link, as indicated at block 470.

While the present invention has been particularly shown and described with reference to a preferred embodiment, it will be understood by those skilled in the art that various changes in form and detail can be made therein without departing from the spirit and scope of the invention. Furthermore, as used in the specification and the appended claims,

TABLE 3

| PREDICTED/ACTUAL | ELECTRICAL/UI/NET CONTROLLER | FINISHING | INTEGRATED SYSTEM | PAPER FEED/REG | PRINT XPORT/FUSING | SCANNER/DOC HANDLER | XEROGRAPHICS/ROS |
|---|---|---|---|---|---|---|---|
| ELECTRICAL/UI/NET CONTROLLER | 12 | 16 | 0 | 0 | 13 | 0 | 8 |
| FINISHING | 1 | 418 | 0 | 8 | 60 | 0 | 15 |
| INTEGRATED SYSTEM | 0 | 19 | 8 | 3 | 23 | 0 | 11 |
| PAPER FEED/REG | 0 | 46 | 0 | 117 | 77 | 0 | 20 |
| PRINT XPORT/FUSING | 1 | 72 | 0 | 11 | 398 | 0 | 53 |
| SCANNER/DOC | 0 | 4 | 0 | 1 | 8 | 16 | 5 |
| XEROGRAPHICS/ROS | 0 | 65 | 0 | 10 | 73 | 0 | 327 |

The rules engine 280 associated with the support server 250 analyses the printer diagnostic data 310 in order to determine a cause for the problem. The suggested solution set 320 can be typically determined from the database 290 of solutions based on the printer diagnostic data 310 and the fault code. The suggested solution 320 can be sent to the customer 340 for example, via a welcome center agent or a service technician (PDA) 330 depending on the severity of the problem. The centralized support server 250 implementing the rules engine 280 enables the support center to have the latest diagnostics utilities as well as the latest solutions to problems. The communications link 220 enables a large number of users to communicate quickly and efficiently with the support server 250.

Figure 4:
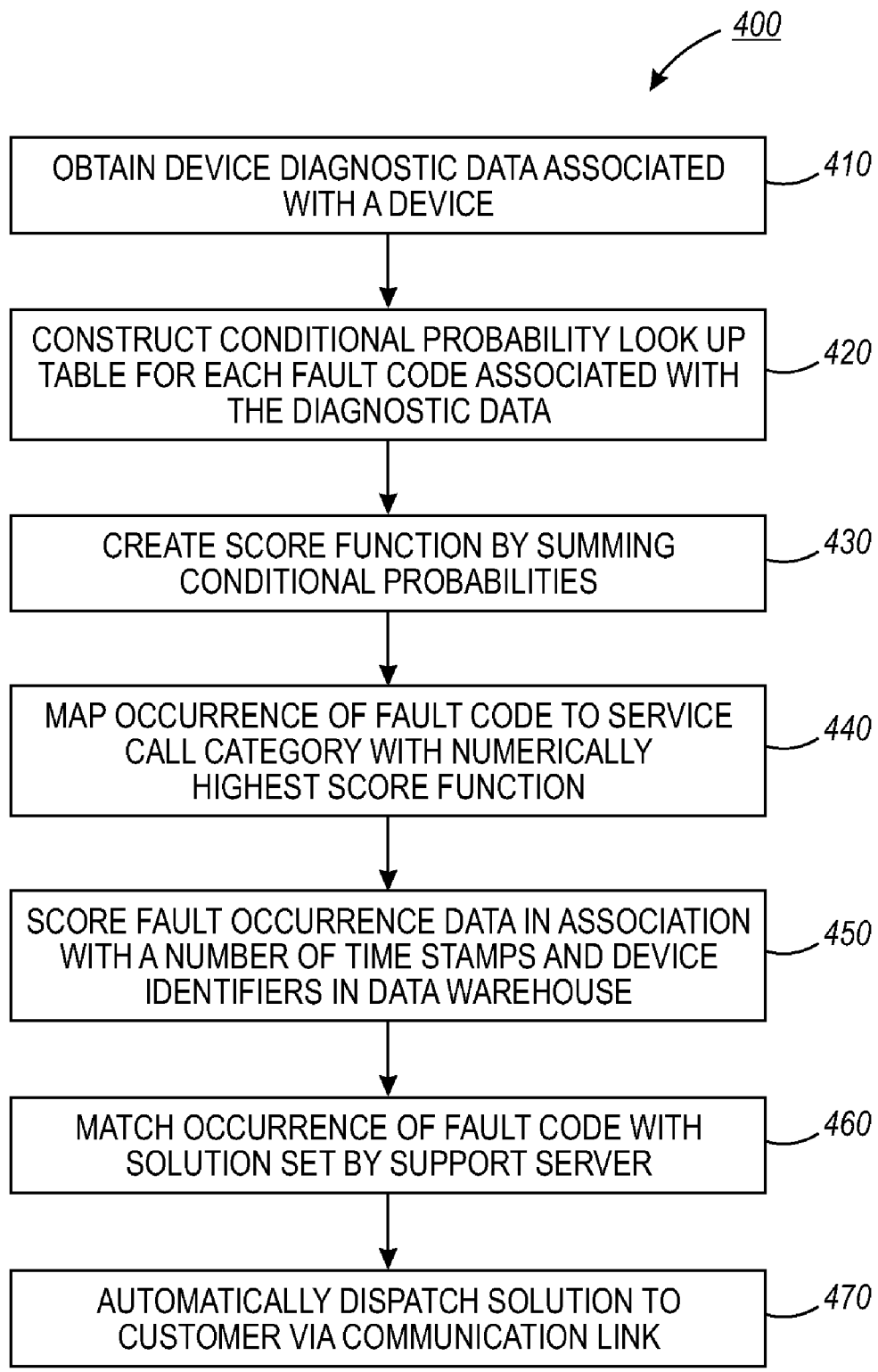
FIG. 4 illustrates a high level flow chart of operations illustrating logical operational steps of a method for extracting the fault codes with respect to a problem from a set of device data, in accordance with the disclosed embodiments.

FIG. 4 illustrates a high level flow chart of operations illustrating logical operational steps of a method 400 for extracting the fault codes with respect to a problem from a set of device data, in accordance with the disclosed embodiments. It can be appreciated that each of the steps or logical operations of the method 400 depicted in FIG. 4 can be implemented by executing a' program instruction or a group of instructions in a data-processing system, such as, for example, the system 100 depicted in FIG. 1, the system 200 depicted in FIG. 2 and the like. The instructions depicted in FIG. 4 can be provided by, for example, a module or group of modules, as discussed earlier herein.

The device diagnostic data with respect to a device can be obtained, as indicated at block 410. The conditional probability look up table 270 can be constructed for each fault code associated with the diagnostic data, as illustrated at block 420. The score function can be created by summing the conthe term "computer" or "system" or "computer system" or "computing device" includes any data processing system or apparatus including, but not limited to, personal computers, servers, workstations, network computers, main frame computers, routers, switches, a Personal Digital Assistants (PDA), cellular telephones, a Smartphone, and/or any other system capable of processing, transmitting, receiving, capturing and/or storing data. Thus, the data-processing apparatus 110 depicted in FIG. 1, for example, can equally be implemented as a PDA, cellular telephone, Smartphone, laptop computer, as well as other types of personal or desktop computers.

Based on the foregoing, it can be appreciated that in an embodiment, a method is disclosed herein which includes classifying device diagnostic data with respect to a device in accordance with a problem type in order to thereafter extract at least one fault code based on a classification algorithm associated with a diagnostic server, by executing a program instruction in a data-processing system; and matching an occurrence of the fault code(s) with respect to a solution set by a decision support server in order to thereafter automatically dispatch the solution set to a customer via a communications link, by executing a program instruction in a data-processing system.

In another embodiment of such a method, a step can be implemented for constructing a conditional look up table including a conditional probability for the fault code(s), by executing a program instruction in a data-processing system; and creating a score function by summing the conditional probability associated with the fault code(s) in order to thereafter map the occurrence of the fault code(s) to a service call category with a numerically highest score function, by executing a program instruction in a data-processing system.

In yet another embodiment of such a method, an operation can be implemented for storing in a memory, the fault code(s) in association with a plurality of time stamps and device identifiers, by executing a program instruction in a data-processing system. In still another embodiment of such a method, the aforementioned memory can be, for example, a database, a data warehouse, and so forth. In some embodiments of such a method, the aforementioned device may constitute an MFD.

In other embodiments of such a method, an operation can be implemented for transmitting the diagnostic data to the diagnostic server via the communications link, by executing a program instruction in a data-processing system. In yet other embodiments of such a method, the aforementioned communications link can be, for example, the Internet or another appropriate communications/computer network, including wireless communications networks. In still other embodiments of such a method, an operation can be implemented for sharing the solution set with the customer via a welcome center agent, by executing a program instruction in a data-processing system. In another embodiment of such a method, an operation can be implemented for sharing the solution set with the customer via a service technician, by executing a program instruction in a data-processing system.

In can be further appreciated based on the foregoing that another embodiment is directed toward a system that includes at least a processor, a data bus coupled to the processor, and a computer-usable medium embodying computer code, the computer-usable medium being coupled to the data bus. In such a system the program code includes instructions executable by the processor and configured for classifying device diagnostic data with respect to a device in accordance with a problem type in order to thereafter extract the fault code based on a classification algorithm associated with a diagnostic server; and matching an occurrence of the fault code with respect to a solution set by a decision support server in order to thereafter automatically dispatch the solution set to a customer via a communications link.

In another embodiment of such a system, such instructions are further configured for storing in a memory, the fault code(s) in association with one or more time stamps and device identifiers. In another embodiment of such a system, such instructions can be configured for constructing a conditional look up table including a conditional probability for the fault code(s), and for creating a score function by summing the conditional probability associated with the fault code in order to thereafter map the occurrence of the fault code to a service call category with a numerically highest score function.

In still another embodiment of such a system instructions can be further configured for storing in a memory, the fault code in association with a plurality of time stamps and device identifiers. In the disclosed system, the aforementioned memory can be, for example, a database, a data warehouse, etc. Additionally, the aforementioned device can be, for example, an MFD. In other embodiments of such a system, the instructions can be configured for transmitting the diagnostic data to the diagnostic server via the communications link (e.g., Internet, computer network, Intranet, wireless communications network, etc). In other embodiment of such a system, the instructions can be configured for sharing the solution set to the customer via a welcome center agent and/or a service technician.

It will be appreciated that variations of the above-disclosed and other features and functions, or alternatives thereof, can be desirably combined into many other different systems or applications. Also that various presently unforeseen or unanticipated alternatives, modifications, variations or improvements therein can be subsequently made by those skilled in the art which are also intended to be encompassed by the following claims.

What is claimed is:

1. A method, comprising:
   classifying device diagnostic data according to a problem type, with respect to a device;
   extracting at least one fault code based on a classification algorithm associated with a diagnostic server, by executing a program instruction in a data-processing system;
   constructing a conditional look up table including a conditional probability for said at least one fault code, by executing a program instruction in a data-processing system;
   creating a score function by summing said conditional probability associated with said at least one fault code in order to thereafter map said occurrence of said at least one fault code to a service call category with a numerically highest score function, by executing a program instruction in a data-processing system; and
   matching an occurrence of said at least one fault code with respect to a solution set by a decision support server in order to thereafter automatically dispatch said solution set to a customer via a communications link, by executing a program instruction in a data-processing system.

2. The method of claim 1 further comprising storing in a memory, said at least one fault code in association with a plurality of time stamps and device identifiers, by executing a program instruction in a data-processing system.

3. The method of claim 2 wherein said memory comprises a database.

4. The method of claim 2 wherein said memory comprises a data warehouse.

5. The method of claim 1 wherein said device comprises an MFD.

6. The method of claim 1 further comprising transmitting said diagnostic data to said diagnostic server via said communications link, by executing a program instruction in a data-processing system.

7. The method of claim 1 wherein said communications link comprises the Internet.

8. The method of claim 1 further comprising sharing said solution set with said customer via a welcome center agent, by executing a program instruction in a data-processing system.

9. The method of claim 1 further comprising sharing said solution set with said customer via a service technician, by executing a program instruction in a data-processing system.

10. A system, comprising:
    a processor;
    a data bus coupled to said processor;
    a computer-usable medium embodying computer code, said computer-usable medium being coupled to said data bus, said computer program code comprising instructions executable by said processor and configured for:
    classifying device diagnostic data according to a problem type, with respect to a device;
    extracting at least one fault code based on a classification algorithm associated with a diagnostic server, by executing a program instruction in a data-processing system;
    constructing a conditional look up table including a conditional probability for said at least one fault code;
    creating a score function by summing said conditional probability associated with said at least one fault code in order to thereafter map said occurrence of said at least one fault code to a service call category with a numerically highest score function; and matching an occurrence of said at least one fault code with respect to a solution set by a decision support server in order to thereafter automatically dispatch said solution set to a customer via a communications link.

11. The system of claim 10 wherein said instructions are further configured for storing in a memory, said at least one fault code in association with a plurality of time stamps and device identifiers.

12. The system of claim 11 wherein said memory comprises a database.

13. The system of claim 11 wherein said memory comprises a data warehouse.

14. The system of claim 10 wherein said device comprises an MFD.

15. The system of claim 10 wherein said instructions are further configured for transmitting said diagnostic data to said diagnostic server via said communications link.

16. The system of claim 10 wherein said communications link comprises the Internet.

17. The system of claim 10 wherein said instructions are further configured for sharing said solution set with said customer via a welcome center agent and/or a service technician.

18. A system, comprising:
a processor;
a data bus coupled to said processor;
a computer-usable medium embodying computer code, said computer-usable medium being coupled to said data bus, said computer program code comprising instructions executable by said processor and configured for:
classifying device diagnostic data according to a problem type, with respect to a device;
  extracting at least one fault code based on a classification algorithm associated with a diagnostic server, by executing a program instruction in a data-processing system; and
  matching an occurrence of said at least one fault code with respect to a solution set by a decision support server in order to thereafter automatically dispatch said solution set to a customer via a communications link;
  constructing a conditional look up table including a conditional probability for said at least one fault code; and
  creating a score function by summing said conditional probability associated with said at least one fault code in order to thereafter map said occurrence of said at least one fault code to a service call category with a numerically highest score function.

* * * * *